United States Patent
Elad et al.

(10) Patent No.: US 8,402,060 B2
(45) Date of Patent: Mar. 19, 2013

(54) SOFTWARE FOR MANAGING DATA BETWEEN A CLIENT AND SERVER

(75) Inventors: Rafi Elad, Herzelia (IL); Ido Keren, Hod Hasharon (IL)

(73) Assignee: SAP AG, Walldorf (DE)

( * ) Notice: Subject to any disclaimer, the term of this patent is extended or adjusted under 35 U.S.C. 154(b) by 1263 days.

(21) Appl. No.: 11/635,707

(22) Filed: Dec. 7, 2006

(65) Prior Publication Data

US 2008/0141237 A1    Jun. 12, 2008

(51) Int. Cl.
 *G06F 17/00* (2006.01)
(52) U.S. Cl. ......... 707/791; 707/802; 707/822; 707/828
(58) Field of Classification Search .................. 709/203; 713/182; 717/170; 726/15; 705/8, 1, 11; 707/600–899
See application file for complete search history.

(56) References Cited

U.S. PATENT DOCUMENTS

| | | | |
|---|---|---|---|
| 7,237,263 B1 * | 6/2007 | Boscolo et al. | 726/15 |
| 2002/0120679 A1 * | 8/2002 | Hayton et al. | 709/203 |
| 2004/0040021 A1 * | 2/2004 | Bharati et al. | 717/170 |
| 2005/0021980 A1 * | 1/2005 | Kanai | 713/182 |
| 2008/0133303 A1 * | 6/2008 | Singh et al. | 705/8 |

* cited by examiner

*Primary Examiner* — Isaac M Woo
(74) *Attorney, Agent, or Firm* — Fish & Richardson P.C.

(57) ABSTRACT

Various techniques and components are provided for managing data between a client and server. In one example embodiment, software is operable to receive an updated business object property at a server, process the updated property with a business object residing on the server, and communicate an updated business object from the server to the client. In certain implementations, this allows for the server to update a complete business object, including properties requiring recalculation based on the updated business object property, through a targeted communication from the client, namely, the single updated business object property. Additionally, the software may provide for the identification and automatic updated of server-side business objects or business object properties related to the received updated business object property.

27 Claims, 8 Drawing Sheets

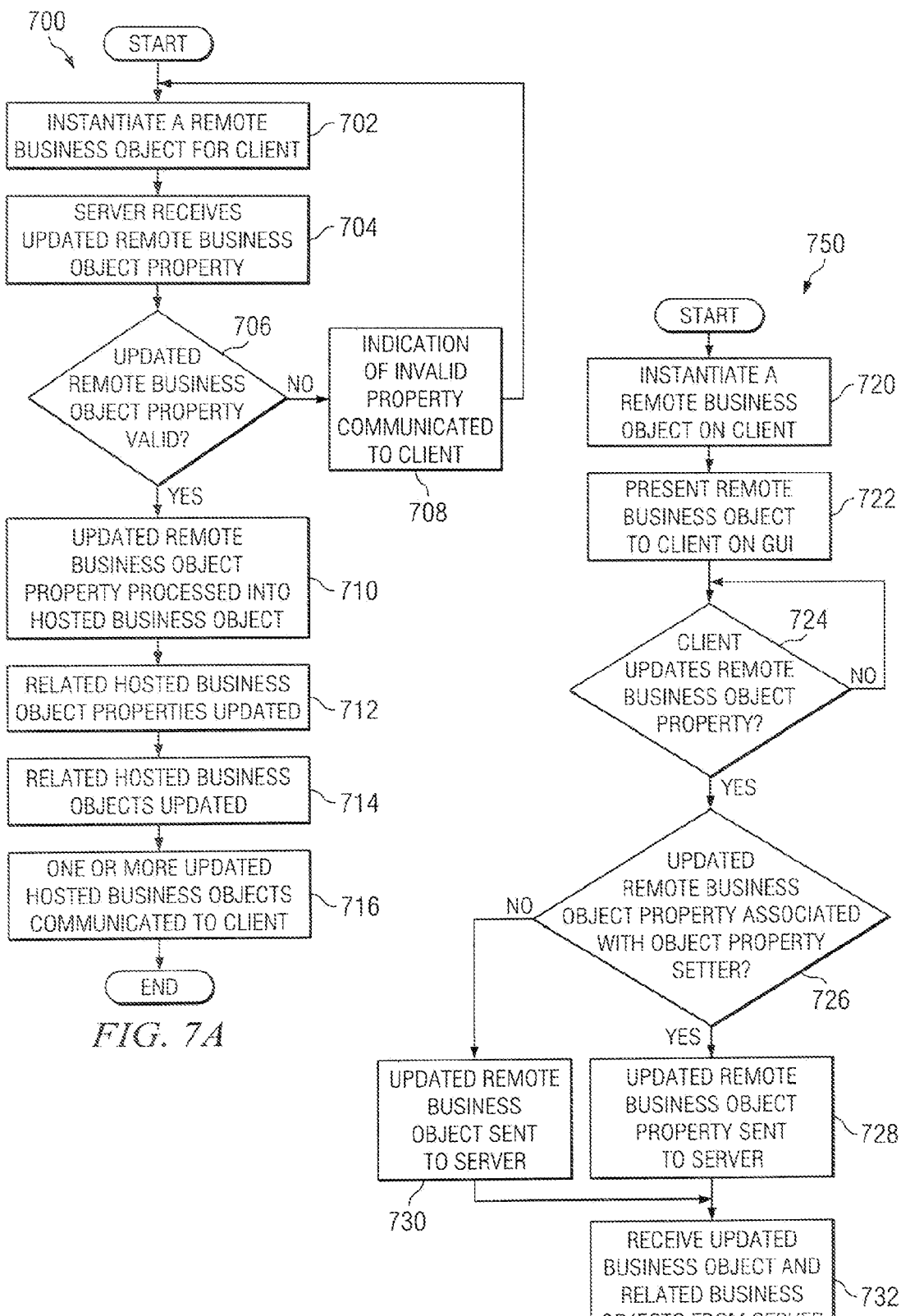

SOFTWARE FOR MANAGING DATA BETWEEN A CLIENT AND SERVER

TECHNICAL FIELD

This disclosure relates to software and, more particularly, to software for managing data between a client and server.

BACKGROUND

Currently, small and large businesses alike complete various transactions through web-based software applications. These transactions consist of the transmission of data between the client (or user) and the server hosting the software application. In many instances, these transactions are carried out through the use of HTML forms or other web-based applications, where the user enters data into various fields or tables and submits the completed form to the server for processing of the data. The server then sends back a response to the user containing the processed form, including the user-entered data and any appropriate messages. Generally, changes made by the user are communicated along with other unchanged, perhaps even unrelated, data. Further, such communications by the client may be triggered only by the user activating a button or by some other proactive technique.

SUMMARY

This disclosure provides various embodiments of software for the management of data between a client and server through, for example, an object property setter. In one implementation, the object property setter is included within a visual development environment in a hosted application on a server. The object property setter identifies a business object on the server, which corresponds to a business object at a remote client. Properties in the business object located on the server are set in accordance with business rules located on the server, such that when the client updates a business object property remotely, the remote business object property is processed on the server according to the business rules.

In another example, an object property setter is attached to a business object property within a business object located on a remote client. When the client updates the property with the attached object property setter, the server receives the updated business object property, where it may be processed according to the business rules located on the server. The hosted instance of the business object property is updated, along with any other business object properties affected by the client's change. These changes to one or more business object properties are encompassed within the hosted business object, which is then communicated to the client.

In another example, the object property setter functions to validate an updated business object property, ensuring that the client enters only valid values within the property. If the client enters an invalid value for a business object property, an indication is communicated to the client so that the client may adjust the value accordingly. For example, a text message may be communicated to the client indicating that the value is in the incorrect format or out-of-range. Additionally, a visual indication may be communicated to the client, highlighting the invalid value on the client's graphical user interface through an appropriate color scheme.

The foregoing example software—as well as other disclosed processes—may also be computer implementable methods. Moreover, some or all of these aspects may be further included in respective systems or other devices for executing, implementing, or otherwise supporting a development environment that can process business objects. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 7A is an example flowchart illustrating the transmission of data between the client and host software application by an object property setter from the server's perspective, in accordance with certain embodiments included in the present disclosure; and FIG. 7B is an example flowchart illustrating the transmission of data between the client and host software application by an object property setter from the client's perspective, in accordance with certain embodiments included in the present disclosure.

DETAILED DESCRIPTION

Figure 1:
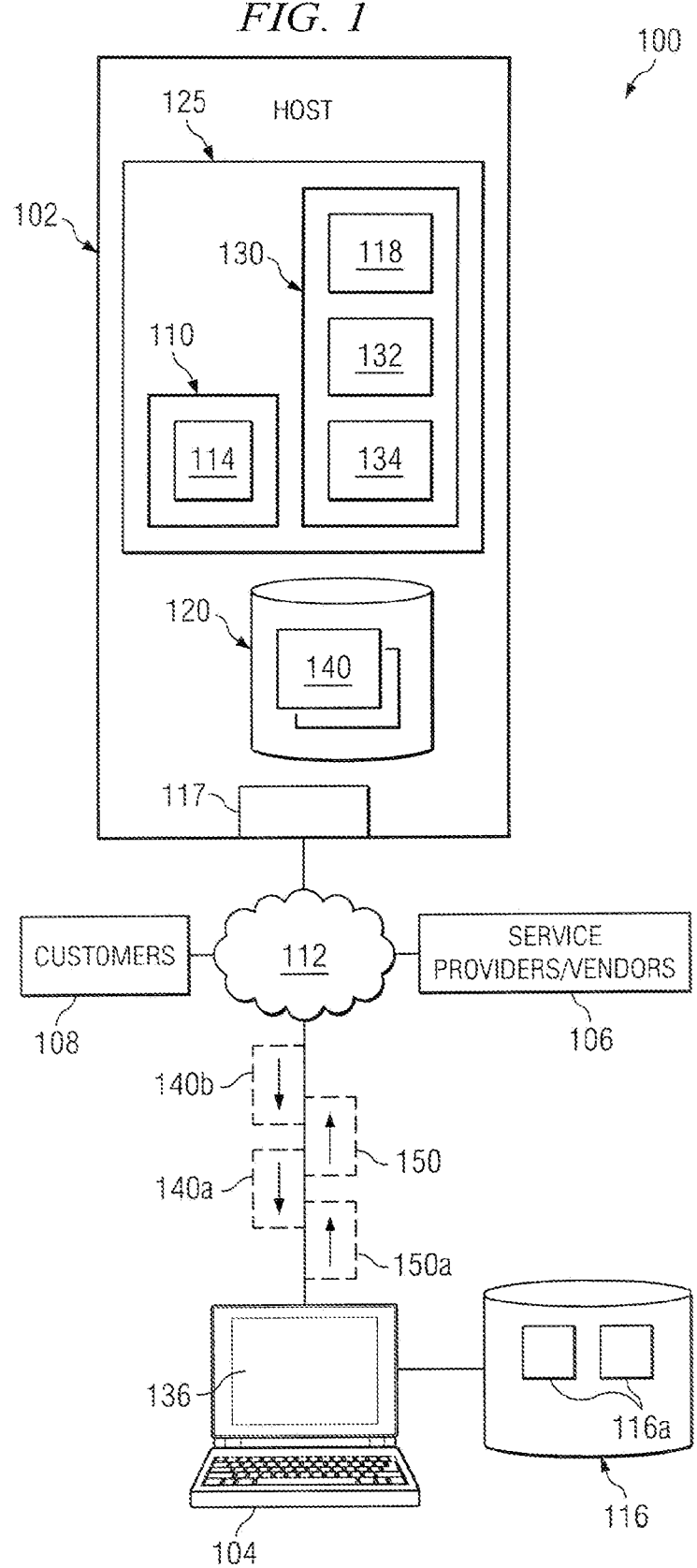
FIG. 1 illustrates an example system for the transmission of data between a client and a hosted software application by an object property setter, in accordance with certain embodiments included in the present disclosure.

FIG. 1 illustrates an example system 100 for the management of data between a client and a hosted software application by an object property setter. An object property setter is a function, or web service, that can be associated with data by a development environment. The object property setter functions to communicate targeted data to a hosted software application for processing of the data. The data, in one instance, is in the form of a business object. "Business object" is typically used herein to describe some information or value collected, known, stored, determined, received, or otherwise identified by some component of system 100 to be associated with a user's role in a business, the user's business, a business application or process, and/or business activity of the user, business, or process or data involved therein. Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time).

Generally, system 100 uses the hosted application 130 to allow developers to provide increased functionality to business applications by identifying business objects with interrelated data and to allow this interrelated data to be intelligently updated upon a change to one or more portions of the data by a client 104. This hosted application 130 may, among other things, be a hosted software application, which achieves a rich, internet application for the client 104 by minimizing scripts, business logic, and processing at client 104. Hosted application 130 may additionally provide for increased bandwidth availability, thereby increasing data transmission speed between client 104 and server 102, as well as allowing for increased implementations by small customers. Further, hosted application 130 may be updated with software code fixes, as appropriate, without requiring any patching, upgrading, or other updating on client 104.

Referring to illustrated FIG. 1, the hosted application 130 resides on server 102 providing various business processes and functionality to client 104. The server 102 may be a server controlled by the developer of the system 100, on a server controlled by the user of the system 100, or alternatively, on a server at a third party providing hosting services. Accordingly, system 100 may implement a suite of tightly integrated products that offer business such as client 104 the ability to implement custom software applications through drag-and-drop or other modeling techniques, without the necessity of customized code.

System 100 is typically a distributed client/server system that spans one or more networks such as 112. As described above, rather than being delivered as packaged software, system 100 may represent a hosted solution, often for an enterprise or other small business that may scale cost-effectively and help drive faster adoption. In this case, portions of the hosted solution may be developed by a first entity, while other components are developed by a second entity. These entities may participate in any suitable form of revenue or cost sharing as appropriate. Moreover, the processes or activities of the hosted solution may be distributed amongst these entities and their respective components. Accordingly, it may enable third-party service providers to offer their services at the business object level through a seamless user-experience. In another example, system 100 may implement a component-based architecture and strong platform helping engage service providers to develop targeted solutions for sub-verticals or others types of markets. This implementation may emphasize features that helps benefit businesses that sell via online stores, thereby leveraging strategic relationships to bring the product to market. In such embodiments, data may be communicated or stored in an encrypted format. This encrypted communication may be between the client and the host or amongst various components of the host. Further, system 100 may store data (user, transaction, service provider, and such) at a relatively central location (over WAN), while concurrently maintaining local data, including a remote business object, at the user's site for redundancy and to allow processing during downtime. But system 100 may be in a dedicated enterprise environment—across a local area network (over LAN) or subnet—or any other suitable environment without departing from the scope of this disclosure.

Turning to the illustrated embodiment, system 100 includes or is communicably coupled with server 102, one or more clients 104, one or more service providers or vendors 106, and one or more customers 108, at least some of which communicate across network 112. Server 102 comprises an electronic computing device operable to receive, transmit, process, and store data associated with system 100. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute an operating system including Linux, UNIX, Windows Server, or any other suitable operating system. According to one embodiment, server 102 may also include or be communicably coupled with a web server and/or a mail server.

Illustrated server 102 includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes hosted business object 140. But memory 120 may also include any other appropriate data such as VPN applications or services, firewall policies, a security or access log, print or other reporting files, HTML files or templates, data classes or object interfaces, child software applications or sub-systems, and others.

Business objects, as used herein, are exemplified by hosted business object 140 stored in memory 120 located on server 102 and remote business object 116 processed, or otherwise manipulated, by client 104 and stored in client 104 memory. As described, business objects 140 and 116 may also include one or more properties. Further, each business object property, as exemplified by remote business object property 116a, may include one or more sub-properties. Although two instances of business objects are shown, for example hosted business object 140 and remote business object 116, these two business objects are near identical, i.e., are mirrors of each other. Although the two illustrated business objects are mirror images of one another, remote business object 116 may be instantiated in two fashions. For example, server 102 may instantiate remote business object 116 on client 104 without any action taken by client 104. Conversely, server 102 may communicate enough data to client 104 such that client 104, itself, instantiates remote business object 116.

Illustrated business objects 140 and 116 include any parameters, pointers, variables, algorithms, instructions, rules, files, links, or other data for easily providing secondary content for any combination of user context and application data at any appropriate level of granularity. It will be understood that such various business object data may be stored or processed using at least one data structure, object, record or file. In a more specific example, a business object may include the user's personal contact information, weather information, a profit and loss report of a company, an OLAP (on-line analytical processing) report, portion of a sales order, an online quotation, as well as many others. In some embodiments, a business object (or pointers thereto) may be stored in one or more tables in a relational database described in terms of SQL statements or scripts. In another embodiment, a business object may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. In short, a business object may comprise one table or file or a plurality of tables or files stored on one computer or across a plurality of computers in any appropriate format.

Illustrated server 102 also includes processor 125. Processor 125 executes instructions and manipulates data to perform the operations of server 102. Processor 125 is, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes hosted application 130.

Figure 2:
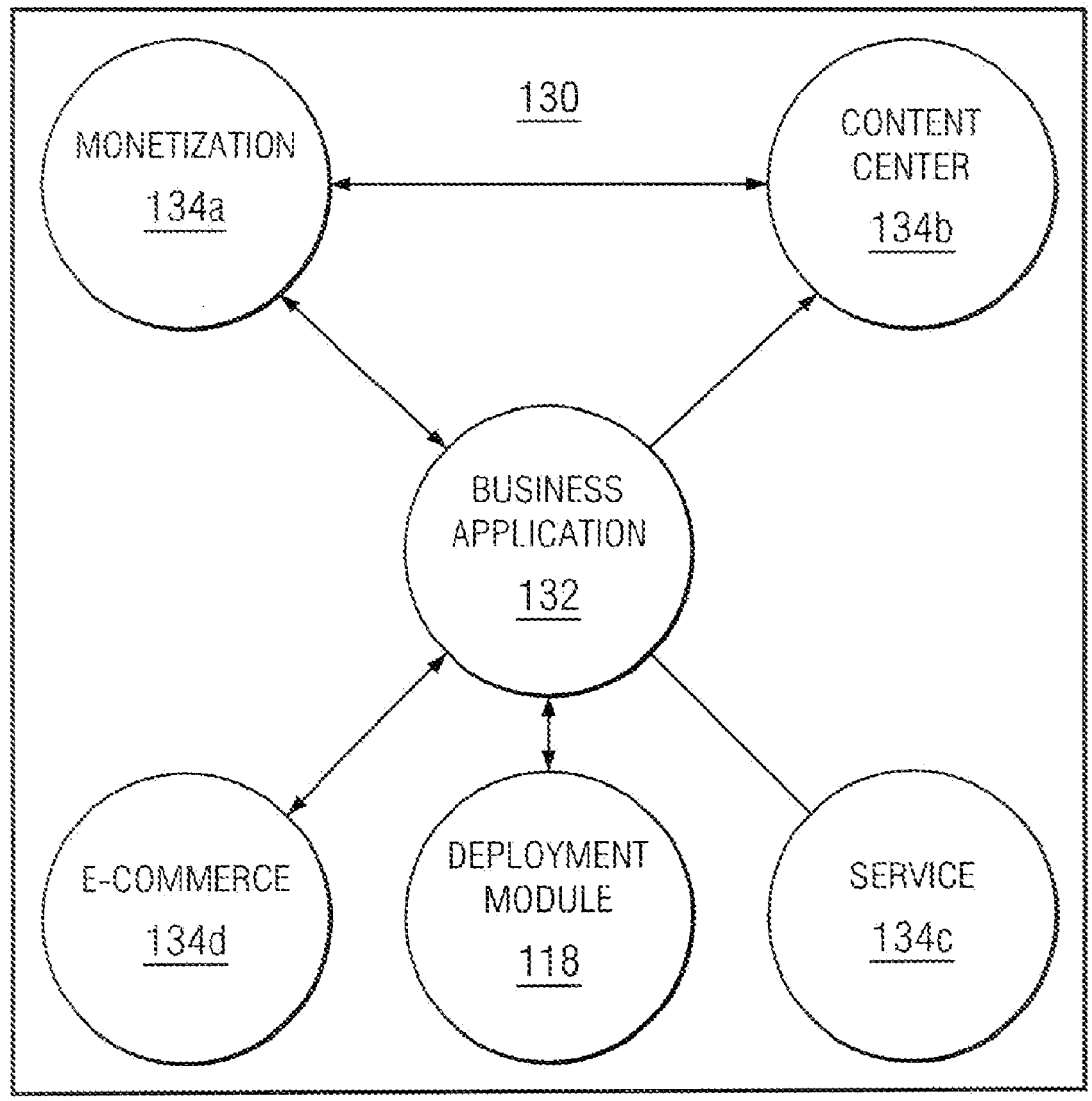
FIG. 2 illustrates an example hosting infrastructure implementing various processes and modules in accordance with one embodiment of the system of FIG. 1.

At a high level, the hosted application 130 is operable to receive and/or process an updated remote business object property 150 from client 104 and present at least a subset of the results to the particular client via an interface. More specifically, hosted application 130 is any application, program, module, process, or other software that receives an updated business object property 150 from a client and presents the updated hosted business object 140a to the client 104. Regardless of the particular implementation, "software" may include software, firmware, wired or programmed hardware, or any combination thereof as appropriate. Indeed, hosted application 130 may be written or described in any appropriate computer language including C, C++, Java, Visual Basic, assembler, Perl, any suitable version of 4GL, as well as others. For example, hosted application 130 may be a composite application, portions of which may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while hosted application 130 is illustrated in FIG. 2 as including a number of sub-modules, exemplified by deployment module 118, business application 132, and third party modules 134 respectively, hosted application 130 may include numerous other sub-modules (as in FIG. 2) or may instead be a single multi-tasked module that implements the various features and functionality through various objects, methods, or other processes. Further, while illustrated as internal to server 102, one or more processes associated with hosted application 130 may be stored, referenced, or executed remotely. For example, a portion of hosted application 130 may be a web service that is remotely called, while another portion of hosted application 130 may be an interface object bundled for processing at remote client 104. Moreover, hosted application 130 may be a child or sub-module of another software module or enterprise application (not illustrated) without departing from the scope of this disclosure.

Illustrated hosted application 130 implements various business rules in processing business objects and/or business object properties. As used herein, "business rules" are generally algorithms, rules, logic, code, or any instructions for utilizing an updated business object property to update a business object or related business object. For example, a business object may be a "Quotation," which may include one or more business object properties such as "Price," "Total," "Ship-to address," "Discount," or any other appropriate property. When client 104 updates a business object property, such as "Discount," one or more additional properties may require updating as well. Deployment module 118 communicates an updated remote business object property 150 to hosted application 130, so that the hosted business object may be updated as required. Business application 132 utilizes business rules in order to update the hosted business object 140 according to the value of updated remote business object property 150. Although business rules are described as being included within business application 132, hosted application 130 may also include business rules, such that an updated remote business object property 150 may be massaged or normalized prior to use by business application 132.

Hosted application 130 also includes deployment module 118, which receives data from client 104 for processing and communicates the processed data back to client 104. In one embodiment, deployment module 118 receives an updated remote business object property 150 from client 104 and relays this data to business application 132. The deployment module 118 further receives processed data from the business application 132 after the business rules have been applied by business application 132. The data received from the business application 132 may be the updated hosted business object 140a. Subsequently, the deployment module 118 communicates the updated hosted business object 140a to client 104. Additionally, deployment module 118 may communicate one or more updated related business objects 140b to client 104.

Processor 125 may also execute a development environment 110, which may include or reference a server-side object property setter 114, which often allows a developer or component to indicate various targeted business object properties. Development environment 110, generally, is any software application designed to develop business software for clients 104 or other entities. Further, development environment 110 allows a developer to develop, update, etc., business applications, business rules, and business objects.

Development environment 110 also includes object property setter 114 as illustrated in FIG. 1. Although illustrated in the singular in FIG. 1, there may be multiple object property setters 114 on model environment 110. The modeler, or developer, identifies a hosted business object that will have a corresponding remote business object at a client in a hosted environment. The modeler may set one or more business object properties with an object property setter 114 in the development environment 110. In other words, the object property setter 114 allows the modeler to set, select, attach, or otherwise provide the business object the capability to send, communicate, or transmit targeted information. In one embodiment, this targeted information includes an updated business object property. In another embodiment, this targeted information includes an updated business object. In still another embodiment, this targeted information includes a business object sub-property, field, table, or any other user control. The hosted business object properties are associated with business rules in the hosted environment as part of the business application 132, such that the updated remote business object property 150 may be processed by the business rules to generate an updated hosted business object 140a. In another example, the business object property is associated with an object property setter through the use of drag-and-drop techniques in the development environment 110.

Although development environment 110 is illustrated in FIG. 1 as residing on server 102, this aspect may also reside on a server located at, or controlled by service providers/ vendors 106. Further, development environment 110 may be located on a server located at, or controlled, by any other third party. As another example, development environment 110 may reside on server 102 but still be accessible to service providers/vendors 106 or other third parties.

Server 102 may also include interface 117 for communicating with other computer systems, such as clients 104, over network 112 in a client-server or other distributed environment. In certain embodiments, server 102 receives data from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.11n, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. In another example, some vendors 106 or customers 108 may represent local vendors 106 or "walk-in" customers 108, respectively, which physically interact with client 104 without use of network 112. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain remote clients 104.

Client 104 is any computing device operable to connect or communicate with server 102 or network 112 using any communication link. At a high level, each client 104 includes or executes at least GUI 136 and comprises an electronic computing device operable to receive, transmit, process, and store any appropriate data associated with system 100. While illustrated separately, client 104 typically includes local memory (shown with remote business object 116) or is coupled with some relatively remote or distributed memory that may be quickly accessed. It will be understood that there may be any number of clients 104 communicably coupled to server 102. Further, "client," "business," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. In certain situations, users may include owners, bookkeepers, as well as third party or outside accountants. For the business owner, system 100 may provide or make available, for example, through client 104 and hosted application 130: i) business status information (seven-day profit & loss report, daily bank statement); ii) customer information (contact information, recent purchases, payment history, credit report); and iii) product information (inventory levels, vendor information, unit cost). In another example, bookkeepers typically do invoicing, bill paying, payroll (whether directly or preparing data for a payroll service), and general banking. For this bookkeeper, system 100 may provide or make available, for example, through client 104 and hosted application 130: i) transaction documentation (purchase orders, invoices); ii) accounting basics (chart of accounts, accounts receivable, accounts payable, tax preparation); iii) human resources information (employee information, benefits tracking); and iv) banking activities (monthly statement reconciliation, business checking, business credit card transactions, customer credit card transactions). For outside accountants, system 100 may provide or make available, for example, through client 104 and hosted application 130: i) a detailed, professional view of the business; ii) analytic tools to drill down to root causes of cash shortfalls or windfalls; iii) tools to project trends and test the effect of decisions; iv) sophisticated business reporting tools to summarize trends and status graphically for the owner; v) annotation tools so they can leave notes in the books for the bookkeeper and for their own future reference; and vi) import and export from third party accounting or business software.

As used in this disclosure, client 104 is any person, department, organization, small business, enterprise, or any other entity that may use or request others to use system 100, namely hosted application 130. For simplicity, client 104 may encompass a personal computer, touch screen terminal, workstation, network computer, kiosk, wireless data port, smart phone, personal data assistant (PDA), one or more processors within these or other devices, or any other suitable processing device used by or for the benefit of client 104. For example, client 104 may be a PDA operable to wirelessly connect with an external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely, the client portion of GUI or application interface 136. Finally, in another embodiment, client 104 may receive the updated business object 140a and update a local business object, e.g. a business object stored on or processed by client 104. Should there be any degree of loss of connectivity between client 104 and server 102, client 104 may be operable to update a server-based business object according to local business rules and a local business object, both stored on client 104. Further, this disclosure contemplates that client 104 may be operable to update the server-based business object even without a loss of connectivity between client 104 and server 102.

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. As shown in later figures, GUI 136 may comprise a plurality of customizable frames or views having interactive fields, pull-down lists, and buttons operated by the user. For example, GUI 136 is operable to display certain remote business objects 116 in a user-friendly form based on the displayed data. Additionally, GUI 136 may operate intelligently, or execute client-side functionality, so as to only communicate one or more updated remote business object properties 116a to server 102. This functionality may be embedded in GUI 136, a web service, or a Java applet that is sent from the server 102 to the client 104.

GUI 136 may also present a plurality of portals or dashboards. For example, GUI 136 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by business objects. GUI 136 is often configurable, supporting a combination of tables and graphs (bar, line, pie, status dials, etc.), and is able to build real-time dashboards, where business object 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 136 may indicate a reference to the front-end or a component of hosted application 130, as well as the particular interface accessible via client 104, as appropriate, without departing from the scope of this disclosure. Therefore, GUI 136 contemplates any graphical user interface, such as a generic web browser or touch screen that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

FIG. 2 illustrates an example hosting infrastructure implementing various processes and modules in accordance with one embodiment of the system of FIG. 1. Of course, while described as a hosted solution, any similar internal or third party implementation may suffice and be within the scope of this disclosure. Returning to the illustration, hosted application 130 includes a deployment module 118, business application 132, as well as a number of services or modules 134. In this example, business application 132 may be developed or owned by a first entity (although potentially hosted by another), while some or all of the service modules 134 may be developed or owned by a secondary entity (who may also be the host). While described in more detail in FIG. 3, application 132 may be considered business software or solution that processes updated data from client 104 communicated through the deployment module 118 according to business rules contained in application 132. More specifically, an example application 132 may be a computer application for performing any suitable business process by implementing or executing a plurality of steps.

For example, the small business services module 134c may comprise a "one-stop" center to enhance aspects of online operations. Such services may include: i) web hosting or tools and infrastructure to build a professional looking web site; ii) merchant solutions—platform to build, manage, and market an online store; iii) business email—communications with custom email addresses, spam protection, and email storage; iv) domain registration; v) marketing tools—local enhanced listing and sponsored search; vi) internet access; and vii) recruiting services or online job postings.

Figure 3:
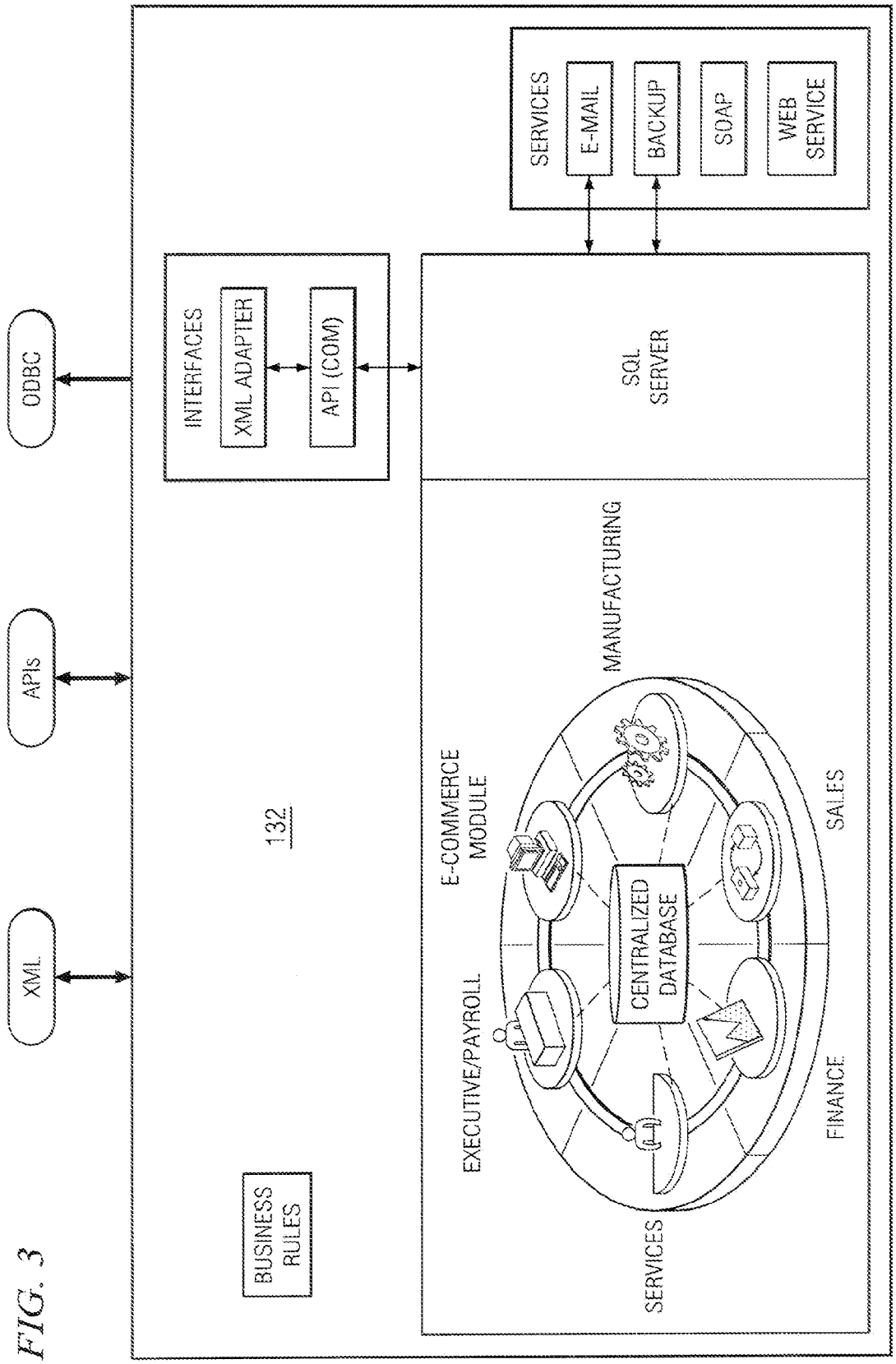
FIG. 3 illustrates an example application implementing certain techniques and components in accordance with one embodiment of the system of FIG. 1.

FIG. 3 illustrates more detail of example business application 132 that, among other things, receives an updated remote business object property 150 from deployment module 118 and processes this property according to business rules contained within the application 132 in accordance with one embodiment of the present disclosure. For example, as the user proceeds through the particular business process (or changes processes), hosted application 130 may automatically update the hosted business object 140 based on this progress or step in the process. Such dynamic presentation within application 132 may deliver quick access to highly accurate, business-critical information, empower business users, or provide end-to-end visibility, while concurrently offering an easy-to-use interface.

For example, application 132 may be a composite application, or an application built on other applications, which includes an object access layer (OAL) and a service layer. In this example, application 132 may execute or provide a number of application services, such as customer relationship management (CRM) systems, human resources management (HRM) systems, financial management (FM) systems, project management (PM) systems, knowledge management (KM) systems, e-commerce compatibly and functionality, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise based systems) and leverage existing investments in the IT platform. Further, composite application 132 may run on a heterogeneous IT platform. In doing so, composite application 132 may be cross-functional in that it may drive business processes across different applications, technologies, and organizations. Accordingly, composite application 132 may drive end-to-end business processes across heterogeneous systems or sub-systems. Application 132 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability.

It will be understood that while this example describes a composite application 132, it may instead be a standalone or (relatively) simple software program integrated with other hosted modules 134 or functionality. Specifically, regardless of the particular hardware or software architecture used, hosted application 130 is generally capable of allowing multiple users from one or more clients 104. System 100 contemplates using any appropriate combination and arrangement of logical elements implementing some or all of the described functionality. For example, some or a majority of the processing or other techniques may be implemented by business application 132, one of the service components 134, or other invoked or referenced libraries or sub-modules not illustrated. In another example, application 132 may also perform processing automatically, which may indicate that the appropriate processing is substantially performed by at least one component of system 100, such as that illustrated in FIG. 1. It should be understood that "automatically" further contemplates any suitable administrator or other user interaction with application 132 or other components of system 100 without departing from the scope of this disclosure.

Figure 4A:
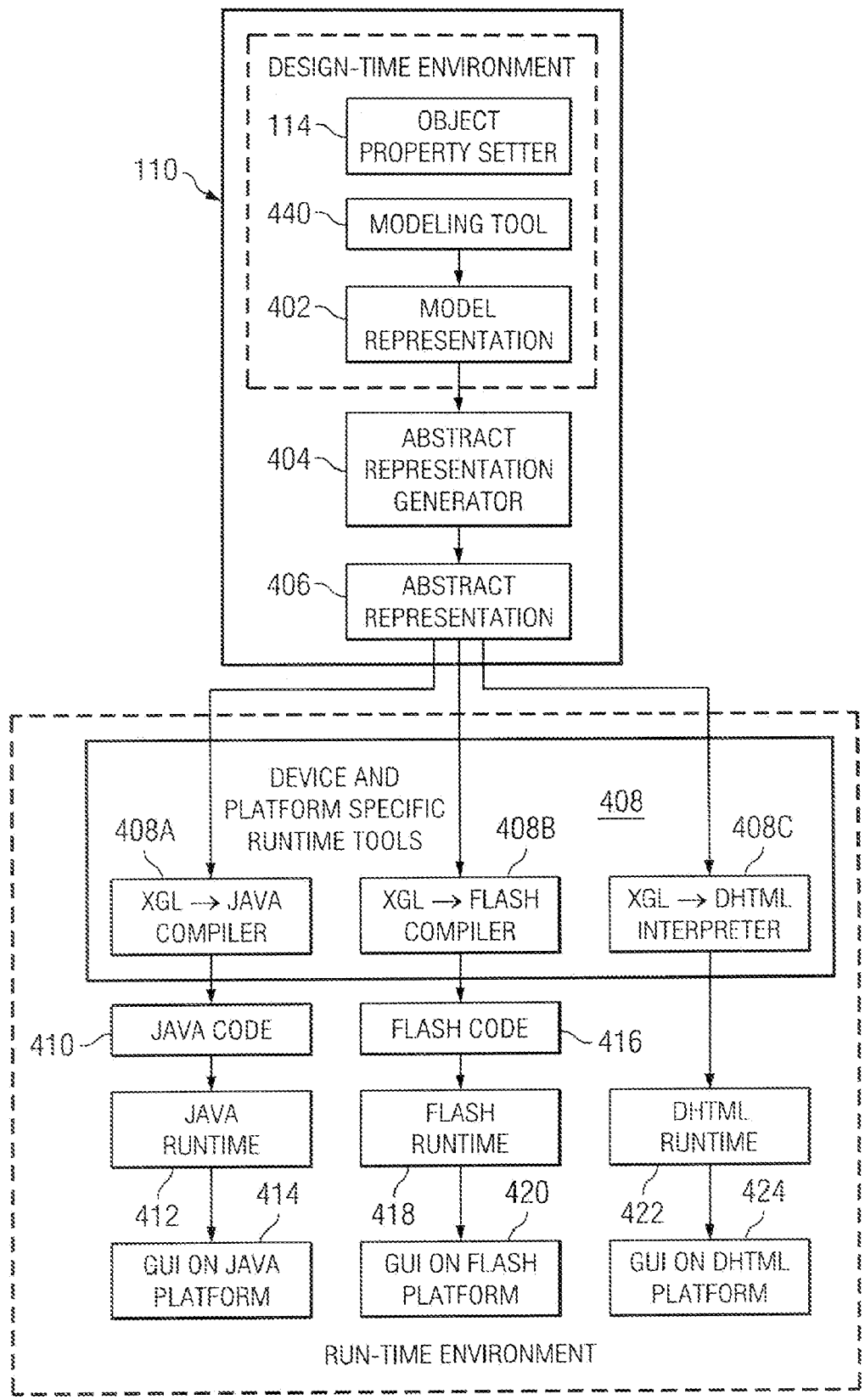
FIG. 4A depicts an example development environment in accordance with one embodiment of FIG. 1.

FIG. 4A depicts an example development environment 110, namely a modeling environment, in accordance with one embodiment of the present disclosure. Thus, as illustrated in FIG. 1, development environment 110 would be a modeling environment 110, which includes object property setter 114. Object property setter 114 may be utilized to set one or more properties of the hosted business object 140 associated with hosted business rules in order for these set properties to be processed according to the hosted business rules. Such a modeling environment 110 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 110 to create pattern-based or freestyle user interfaces using simple drag-and-drop services. Because this development may be model-driven, the modeler can typically compose an application using models of business objects without having to write much, if any, code. In some cases, this example modeling environment 110 may provide a personalized, secure interface that helps unify enterprise applications, information, and processes into a coherent, role-based portal experience. Further, the modeling environment 110 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 110 may provide a shared set of services for finding, organizing, and accessing unstructured content stored in third-party repositories and content management systems across various networks 112. Classification tools may automate the organization of information, while subject-matter experts and content managers can publish information to distinct user audiences. Regardless of the particular implementation or architecture, this modeling environment 110 may allow the developer to easily model hosted business objects 140 using this model-driven approach.

In certain embodiments, the modeling environment 110 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 4A, modeling tool 440 may be used by a GUI designer or business analyst during the application design phase to create a model representation 402 for a GUI application. It will be understood that modeling environment 110 may include or be compatible with various different modeling tools 440 used to generate model representation 402. This model representation 402 may be a machine-readable representation of an application or a domain specific model. Model representation 402 generally encapsulates various design parameters related to the GUI such as GUI components, dependencies between the GUI components, inputs and outputs, and the like. Put another way, model representation 402 provides a form in which the one or more models can be persisted and transported, and possibly handled by various tools such as code generators, runtime interpreters, analysis and validation tools, merge tools, and the like. In one embodiment, model representation 402 maybe a collection of XML documents with a well-formed syntax.

Illustrated modeling environment 110 also includes an abstract representation generator (or XGL generator) 404 operable to generate an abstract representation (for example, XGL representation or XGL-compliant representation) 406 based upon model representation 402. Abstract representation generator 404 takes model representation 402 as input and outputs abstract representation 406 for the model representation. Model representation 402 may include multiple instances of various forms or types depending on the tool/language used for the modeling. In certain cases, these various different model representations may each be mapped to one or more abstract representations 406. Different types of model representations may be transformed or mapped to XGL representations. For each type of model representation, mapping rules may be provided for mapping the model representation to the XGL representation 406. Different mapping rules may be provided for mapping a model representation to an XGL representation.

This XGL representation 406 that is created from a model representation may then be used for processing in the runtime environment. For example, the XGL representation 406 may be used to generate a machine-executable runtime GUI (or some other runtime representation) that may be executed by a target device. As part of the runtime processing, the XGL representation 406 may be transformed into one or more runtime representations, which may indicate source code in a particular programming language, machine-executable code for a specific runtime environment, executable GUI, and so forth, which may be generated for specific runtime environments and devices. Since the XGL representation 406, rather than the design-time model representation, is used by the runtime environment, the design-time model representation is decoupled from the runtime environment. The XGL representation 406 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 406 generated for a model representation 402 is generally declarative and executable in that it provides a representation of the GUI of model 402 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 406 is also not GUI runtime-platform specific. The abstract representation 406 provides a self-contained, closed, and deterministic definition of all aspects of a graphical user interface that is device independent and language independent.

Abstract representation 406 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract generator 404 may be configured to generate abstract representation 406 for models of different types, which may be created using different modeling tools 440. It will be understood that modeling environment 110 may include some, none, or other sub-modules or components as those shown in this example illustration. In other words, modeling environment 110 encompasses the design-time environment (with or without the abstract generator or the various representations), a modeling toolkit (such as 440) linked with a developer's space, or any other appropriate software operable to decouple models created during design-time from the runtime environment. Abstract representation 406 provides an interface between the design time environment and the runtime environment. As shown, this abstract representation 406 may then be used by runtime processing.

As part of runtime processing, modeling environment 110 may include various runtime tools 408 and may generate different types of runtime representations based upon the abstract representation 406. Examples of runtime representations include device or language-dependent (or specific) source code, runtime platform-specific machine-readable code, GUIs for a particular target device, and the like. The runtime tools 408 may include compilers, interpreters, source code generators, and other such tools that are configured to generate runtime platform-specific or target device-specific runtime representations of abstract representation 406. The runtime tool 408 may generate the runtime representation from abstract representation 406 using specific rules that map abstract representation 406 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 406 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 4A, an XGL-to-Java compiler 408a may take abstract representation 406 as input and generate Java code 410 for execution by a target device comprising a Java runtime 412. Java runtime 412 may execute Java code 410 to generate or display a GUI 414 on a Java-platform target device. As another example, an XGL-to-Flash compiler 408b may take abstract representation 406 as input and generate Flash code 416 for execution by a target device comprising a Flash runtime 418. Flash runtime 418 may execute Flash code 416 to generate or display a GUI 420 on a target device comprising a Flash platform. As another example, an XGL-to-DHTML (dynamic HTML) interpreter 408c may take abstract representation 406 as input and generate DHTML statements (instructions) on the fly which are then interpreted by a DHTML runtime 422 to generate or display a GUI 424 on a target device comprising a DHTML platform.

It should be apparent that abstract representation 406 may be used to generate GUIs for Extensible Application Markup Language (XAML) or various other runtime platforms and devices. The same model representation 406 may be mapped to various runtime representations and device-specific and runtime platform-specific GUIs. In general, in the runtime environment, machine executable instructions specific to a runtime environment may be generated based upon the abstract representation 406 and executed to generate a GUI in the runtime environment. The same XGL representation may be used to generate machine executable instructions specific to different runtime environments and target devices.

According to certain embodiments, the process of mapping a model representation 402 to an abstract representation 406 and mapping an abstract representation 406 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 406 rather than model representation 402 for runtime processing, the model representation 402 that is created during design-time is decoupled from the runtime environment. Abstract representation 406 thus provides an interface between the modeling environment and the runtime environment. As a result, changes may be made to the design time environment, including changes to model representation 402 or changes that affect model representation 402, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 4B:
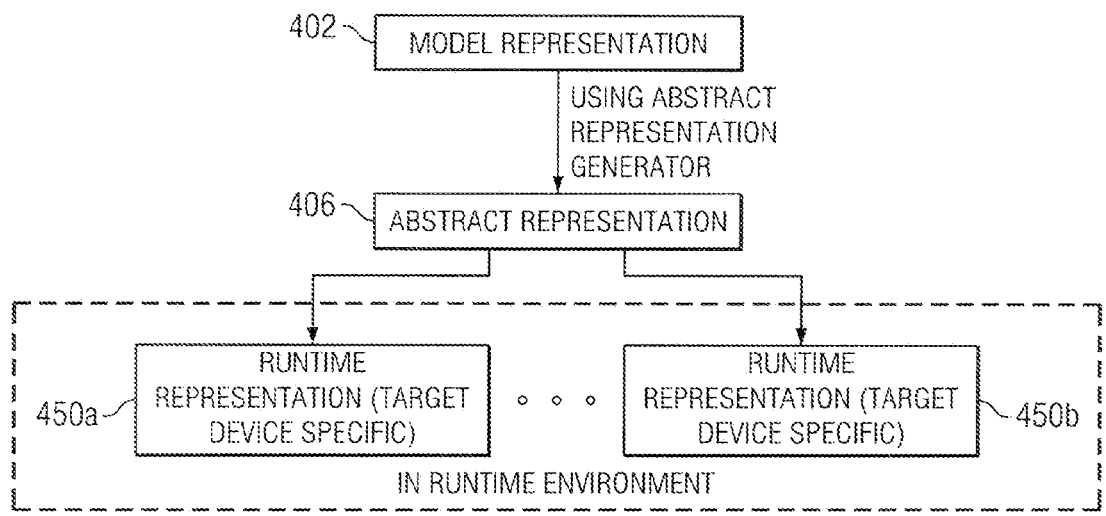
FIG. 4B depicts a simplified process for mapping a model representation to a runtime representation using the example development environment of FIG. 4A or some other development environment.

FIG. 4B depicts an example process for mapping a model representation 402 to a runtime representation using the example modeling environment 110 of FIG. 4A or some other modeling environment. Model representation 402 may comprise one or more model components and associated properties that describe a data object, such as hosted business object 140. As described above, at least one of these model components is based on or otherwise associated with these hosted business objects 140. The abstract representation 406 is generated based upon model representation 402. Abstract representation 406 may be generated by the abstract representation generator 404. Abstract representation 406 comprises one or more abstract GUI components and properties associated with the abstract GUI components. As part of generation of abstract representation 406, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 450a, including GUIs for specific runtime environment platforms, may be generated from abstract representation 406. A device-dependent runtime representation may be generated for a particular type of target device platform to be used for executing and displaying the GUI encapsulated by the abstract representation. The GUIs generated from abstract representation 406 may comprise various types of GUI elements such as buttons, windows, scrollbars, input boxes, etc. Rules may be provided for mapping an abstract representation to a particular runtime representation. Various mapping rules may be provided for different runtime environment platforms.

Figure 5:
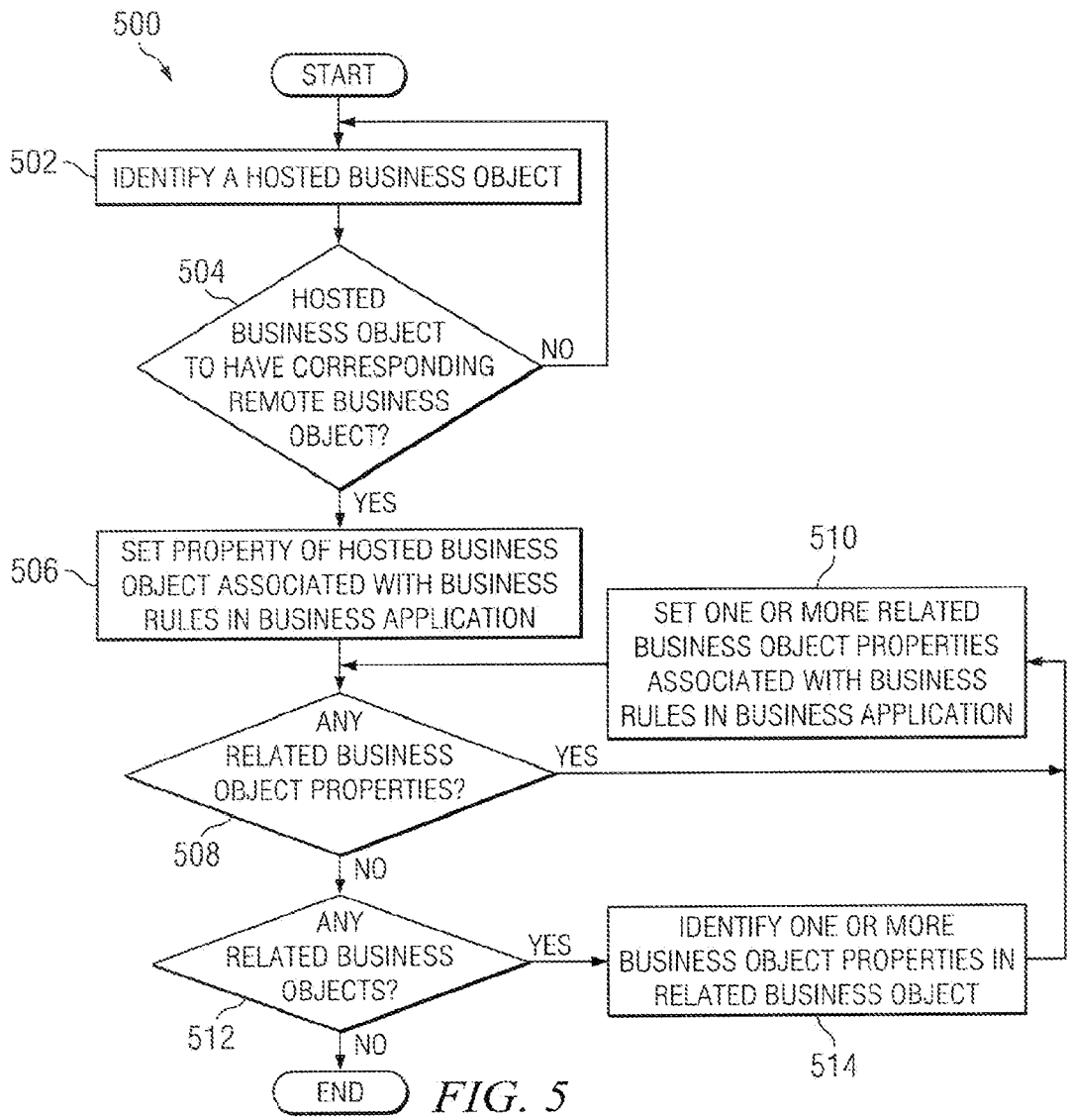
FIG. 5 is an example flowchart illustrating the development of the object property setter in the development environment, in accordance with certain embodiments included in the present disclosure.
Figure 6A:
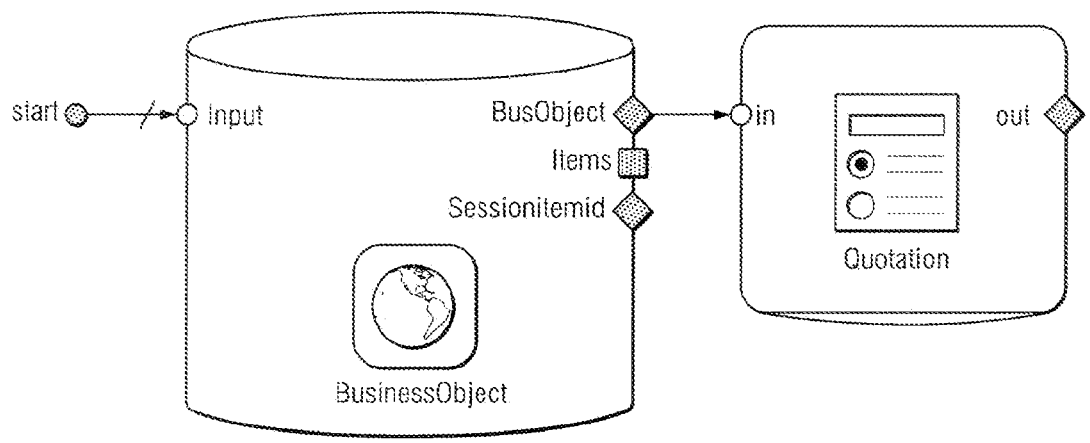
FIG. 6A depicts a model representation of a business object.

FIG. 5 illustrates the development software encompassing the object property setter in flowchart form, in accordance with one embodiment of the system 100. In step 502, the modeler identifies a hosted business object 140 residing on server 102. The hosted business object 140 may be, for example, a "Quotation" as shown in FIG. 6A. A "Quotation," as one embodiment of a business object, may have one or more properties, such as a "Total" (as, for example, a total price of a product or service) and a "Discount." Further properties may include a "Ship-to address," "Tax rate," and "Billing address," to name only a few. Additionally, it may be understood that each hosted business object property may include sub-properties, or child properties. For example, a "Ship-to address" property may have one or more sub-properties, such as "Ship-to street," "Ship-to city," and "Ship-to zip code." Sub-properties may be fields, tables, user-control settings, children, or nodes, as appropriate. As described herein, object property setter functionality applies to sub-properties, as well as business object properties.

Continuing with FIG. 5, in step 504, the modeler determines whether the hosted business object 140 will lead to a remote business object 116 located on the client 104. Should there be no corresponding remote business object 116, the modeler returns to identify a second hosted business object 140. However, if there is a corresponding remote business object 116 on client 104, the modeler moves to step 506.

Figure 6B:
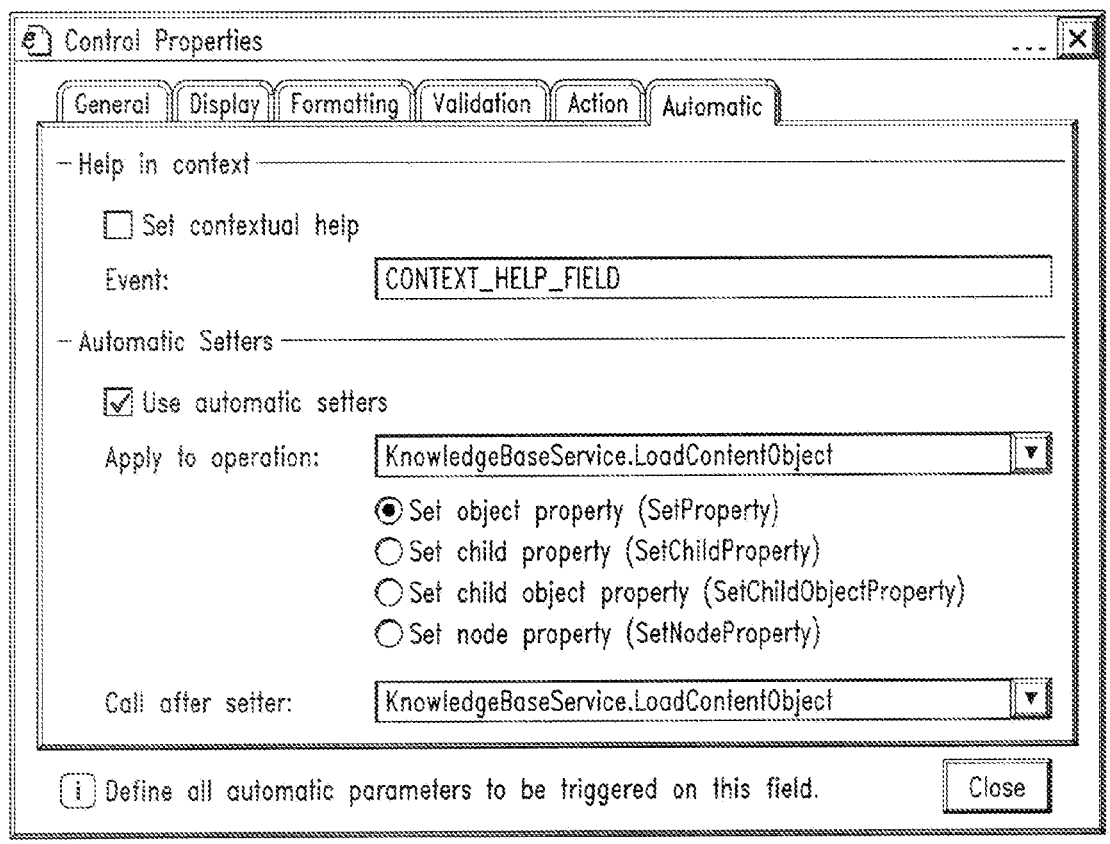
FIG. 6B depicts the GUI utilized by the developer to assign an object property setter to a property of the business object of FIG. 6A.

In step 506, the modeler utilizes object property setter 114 to set a property of the hosted business object 140 associated with business rules located in business application 132. The object property setter may be included within a development environment 110, as shown in FIG. 1. For example, development environment 110, exemplified here as modeling environment 110, may include a GUI, which allows the modeler to set the property, as exemplified in FIG. 6B. FIG. 6B depicts the GUI utilized by the modeler to assign an object property setter to a business object property. Although unrelated to the object property setter, this GUI also includes an option to set contextual help in the modeling environment 110. In certain situations, contextual help objects can more efficiently provide on-demand or task-sensitive help to users of one or more applications developed using business objects. Contextual help objects may be associated with a field, a screen, an error message, a business process, a best practices level, or any other business object. Often, this business object is a web service that might then be considered a user friendly web service. For example, the executed (or invoked) business object may be graphically linked within a development tool to one or more contextual help objects via metadata in the right time and place. In this fashion, multiple implementations or instances of the particular or similar business objects may reference or link to the help object. In another example, the help objects may be linked to a web service front-end based on events, behavior, situation at design time, and so forth. This may also allow system 100 to partially or fully decouple the work of the developer and an information developer. Such example aspects may provide a faster learning curve via problem-oriented learning, increase user satisfaction and adoption of such developed business objects by increasing usability, increasing user efficiency with guidance and help, as well as to potentially reduce errors. This may allow the example business owner or enterprise to more easily train the users in a highly targeted fashion. Moreover, graphically linking such contextual help to these business objects may help increase volume readiness for the particular developer, reseller, or host by reducing the need for support.

Figure 6C:
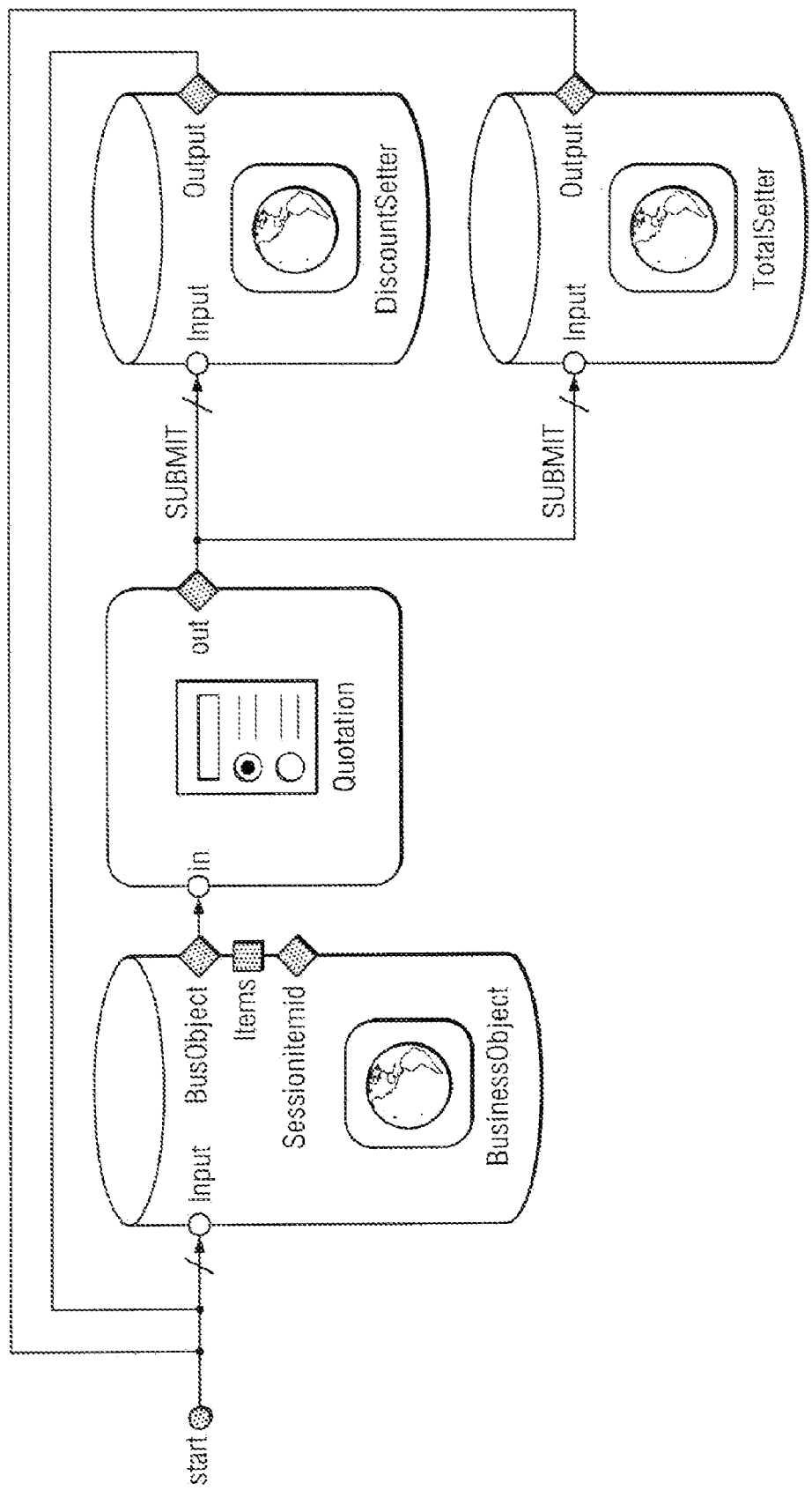
FIG. 6C depicts a model representation of the business object including two object property setters assigned to corresponding business object properties.

Continuing with step 506, as shown in FIG. 6B, one aspect of the GUI in modeling environment 110 includes the option to use object property setter 114. After the modeler identifies a particular hosted business object, the object property setter 116 is invoked by selecting the automatic setter option in the GUI. The modeler may use the object property setter at varying levels of granularity, as shown in FIG. 6B. For example, the object property setter may be applied to an object property, child property, child object property, or node property. The modeler completes the setting of the property in the hosted business object by applying the setter to a chosen operation, i.e., a business rule located in business application 132. As illustrated in FIG. 6C, a model representation of a business object "Quotation" may include at least two object property setters assigned to corresponding business object properties, such as "Discount" and "Total."

In step 508, any related business object properties of the set property in the hosted business object 140 are identified. For example, identification may be accomplished on a property-by-property basis by the modeler. This may require the modeler to identify or know the relationships between various business object properties and/or sub-properties. For example, a related property to the "Discount" business object property may be the "Total" business object property. Thus, when "Discount" property is updated by client 104, "Total" will require recalculation according to the business rules in business application 132. In order for the "Total" property to be recalculated, the modeler sets this property of the hosted business object, as illustrated in step 510. Additional related business object properties may be set as required. The modeler sets a business object property to one or more additional business object properties by any process, which allows the one or more related business object properties to be updated when client-side business object properties are changed by client 104. Additionally, identification of a related business object property by the modeler may be accomplished through other modeling techniques, including drag-and-drop functionality.

Continuing with step 512, in addition to identifying any related business object properties, the modeler may identify one or more related business objects to the particular hosted business object 140. Once the related business object (or multiple related business objects) is identified, the modeler may identify one or more related business object properties in the related business object, as shown in step 514. Just as the previously identified related business object properties within hosted business object 140 are set as illustrated in step 510, the newly identified related business object properties of the related business object (or objects) are thus set.

In another embodiment, identification of related business object properties may occur automatically through the use of the object property setter 116. For example, once the modeler sets a particular business object property, any related properties, such as sub-properties or properties within the same level of granularity, may be recalculated based on the updated remote business object property 150 from client 104. Object property setter 116 may be an intelligent function, which allows for the identification of related business objects, related business object properties, or related business object sub-properties without the need for a modeler, developer, or other analyst. In this embodiment, object property setter 116 identifies related data, as described previously, based on business rules in business application 132 or hosted application 130.

FIG. 7A illustrates one example method 700 for the management of data between the client and server by an object property setter. In step 702, a remote business object 116 is instantiated on client 104, such that the remote business object 116 is viewable on GUI 136. Instantiation may occur, for example, by hosted application 130, which sends a hosted business object to client 104. As another example, hosted application 130 may send data associated with hosted business object 140 to client 104 such that the client 104 instantiates remote business object 116. Regardless of the particular embodiment, two similar or near identical instances of the business object exist: one on the server session and one in client memory.

As described in FIG. 1, client 104 is connected to server 102 through the network 112 and interface 117. Thus, hosted application 130 may operate in the background of the application being viewed by client 104 through GUI 136. In one embodiment, remote business object 116 is a "Quotation," which may include one or more of the following adjustable remote business object properties 116a: "Price," "Discount," "Billing address," "Ship-to address," "Ship-from address," "Tax rate," "Shipping fees," "Purchaser," "Seller," "Manufacturer," "Payment information," and "Shipping tracking number." Additional or fewer business object properties may be included as appropriate. Further, a remote business object property 116a may contain sub-properties. For example, a "Ship-to address" value may contain one or more sub-properties of "Ship-to street," "Ship-to city," "Ship-to state," and "Ship-to zip." As described herein, any hosted application 130 functionality described would apply to properties, sub-properties, or other levels of granularity. Additionally, updated remote business object property 150 may include either a numerical, textual, or symbolic value or combination thereof, as appropriate, and a value identifier.

Updated remote business object property 150 is received by server 102 through network 112 as shown in step 704. The updated remote business object property 150 includes an attached object property setter 114. Specifically, deployment module 118 in hosted application 130 receives the updated remote business object property 150. In another embodiment, updated remote business object 150a is received by server 102 if the particular remote business object property 116a does not have an attached object property setter.

In step 706, the object property setter attached to the updated remote business object property validates the property value, ensuring that client 104 has entered a legitimate value. One example of an invalid business object value would be the insertion of character values into a remote business object property 116a by client 104 when only a numerical value is acceptable, or vice versa. Another example would be the insertion of an out-of-range numerical value into a remote business object property 116a by client 104. This determination occurs on server 102, thus eliminating business logic associated with this functionality on client 104.

As shown in step 708, hosted application 130 communicates a response to client 104 through interface 117 and network 112. This response includes, for example, a textual message informing client 104 that an invalid value was entered for updated remote business object property 150. This message may further include the constraints on the value. For example, if an invalid value is entered for the "Discount," the message may inform client 104 that "Discount must be a numerical integer between 0 and XX," with "XX" being an adjustable range maximum. This message would be customizable in the hosted application 130. Additionally, the response may include a visual message to the client 104. The visual message could be, for example, a color scheme designed to highlight the remote business object property 116a on GUI 136, thus drawing the client's attention to the invalid value. Client 104 would then be able to enter a valid value.

In step 710, hosted application 130 processes the remote business object property 150 into hosted business object 140. Specifically, once deployment module 118 receives the updated remote business object property 150 from client 104, the updated property is communicated to business application 132 so that the business rules contained therein may be applied to process the updated remote business object property 150 into the hosted business object. Processing occurs on server 102 by utilizing one or more processors 125. Hosted business object 140 includes identical business object properties as remote business object 116. Continuing the example used above, the updated remote business object property "Discount" would be processed into the hosted business object 150, such that the hosted property value of "Discount" now reflects the updated property value. In another embodiment, updated remote business object 150a is processed by server 102 into hosted business object 140. This requires the processing of each property and/or sub-property within hosted business object 140 according to the business rules.

Further, in step 712, business application 132 processes any related hosted business object properties affected by the change made to a property by client 104. The processing of the related hosted business object properties occurs according to the business rules contained in the application 132. For example, should client 104 update remote business object property "Discount," other related hosted business object properties, such as "Total" or "Shipping fees," may require recalculation. Business application 132 would update the hosted business object properties "Total" and "Shipping fees" according to the updated remote business object property "Discount" and the hosted business rules.

Just as related hosted object properties are updated upon a change to a remote business object property 116a, related business objects may be processed by business application 132 as shown in step 714. Thus, if client 104 changes a remote business object property within a remote business object 116, other remote business objects may require updating. For example, client 104 may choose to update the remote business object property "Ship-to address" in remote business object "Quote." However, this change may affect remote business object "Customer," which may be a business object containing contact information for a particular customer 108 of client 104, including a "Ship-to address" property. Business application 132 processes updated remote business object "Ship-to address" into both hosted instances of business objects "Quotation" and "Customer," thereby ensuring that each hosted business object 140 is accurate and up-to-date. Thus, client 104 is assured that updating a single remote business object property results in the modification of all related business objects, properties, and sub-properties residing on server 102.

In step 716, hosted application 130 communicates an updated hosted business object 140a through interface 117 and network 112 to client 104. GUI 136 would thus display remote business object 116, which now corresponds to updated hosted business object 140a. In this way, hosted application 130 ensures that both the hosted and remote business objects are identical, while requiring minimal transmission bandwidth and minimal business logic at client 104. Client 104 views the aforementioned process as realtime updating of remote business object 116 due to increased GUI 136 response time and the off-loading of processing onto server 102.

FIG. 7B illustrates another example method 750 for the management of data between the client and server by an object property setter. In step 720, a remote business object 116 is instantiated on client 104, such that the remote business object 116 is viewable on GUI 136 in step 722. As described above, instantiation may occur, for example, by hosted application 130, which sends a hosted business object to client 104, or conversely, hosted application 130 may send a portion of a hosted business object to client 104, such that the client 104 instantiates remote business object 116. Regardless of the particular embodiment, two identical instances of the business object exist: one on the server session and one in client memory.

In step 724, client 104 may choose to update a remote business object property 116a or not, with the understanding that remote business object 116 is identical to hosted business object 140 absent any changes made by client 104. Should client 104 choose to change or update a remote business object property 116a, this would be accomplished through any typical user interface, such as a keyboard, mouse, touch-pad, and/or touch screen. Of course, other suitable input devices or techniques are within the scope of the present disclosure. Continuing the example as described in FIG. 7A, client 104 updates a remote business object property 116a, for example, by changing the "Discount" property in the field identified "Discount" and exiting that field.

Once client 104 updates a remote business object property 116a, for example, a "Discount" property within a "Quotation," the data transmitted to the server 102 is dependent on whether an object property setter 114 is attached to the updated property, as illustrated in step 726. If an object property setter is attached, then it communicates only the updated remote business object property 150 to hosted application 130 on server 102, as shown in step 728. For example, once client 104 changes remote business object property "Discount," the object property setter attached to the remote instance of this property communicates the changed property to the object property setter attached to the hosted instance of the property. Should the updated remote business object property 150 have no attached object property setter, then the entirety of remote business object 116 is communicated to server 102 for processing in step 730.

Since processing of the remote business object or any of its properties or sub-properties occurs on server 102, as opposed to client 104, the client may take no action again until it receives the updated business object 140a plus related business objects, 140b, if any, from server 102, as illustrated in step 732. In other cases, client 104 may perform unrelated processing such that downtime (however minimal) is reduced. Once client 104 receives the updated business object 140a and one or more updated related business objects 140b, if any, the client 104 or server 102 may instantiate the business objects on client 104. The user may then view the updated business objects on GUI 136.

It will be understood that these methods are for illustration purposes only and that the described or similar processes and techniques may be performed at any appropriate time, including concurrently, individually, or in combination. For example, the processing of related business object properties and related business objects may be executed or otherwise invoked concurrently. In addition, many of the steps in this flowchart may take place simultaneously and/or in different orders than as shown. Moreover, system 100 may use or implement similar methods with additional steps, fewer steps, and/or different steps, so long as the methods remain appropriate. For example, should the client be partially or totally disconnected from the server for a period of time, i.e. working off-line, a local business object on the client would be updated according to business rules located on the client upon a change to one or more remote business object properties. Thus, the client-instance of the business object would be more up-to-date than the server-instance of the business object. Once the client-server connectivity is reestablished, the hosted business object would be updated by the client according to business rules located on the client.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure.

What is claimed is:

1. A computer storage medium encoded with a computer program, the program comprising instructions that when executed by one or more computers cause the one or more computers to perform operations comprising:
    receiving an updated remote business object property from a client;
    determining a validity of a value of the updated remote business object property by comparing the value to one or more validity rules that define at least one of a character form of the value or a value range of the value;
    based on a determination of a valid value, processing the updated remote business object property into a hosted business object using hosted business rules, the hosted business object comprising a representation of a type of a uniquely identifiable business entity described by a structural model, wherein the hosted business object comprises:
- a first hosted business object property corresponding with the updated remote business object property, the first hosted business object property set, by the processing, to the updated remote business object property; and
- a second hosted business object property related to the updated remote business object property; and communicating an updated hosted business object to the client.

2. The computer storage medium of claim 1, wherein the operations further comprise instantiating a remote business object at the client based on the updated hosted business object.

3. The computer storage medium of claim 1, wherein the operations further comprise communicating a hosted business object to the client such that the client instantiates the remote business object at the client based on the received updated hosted business object.

4. The computer storage medium of claim 1, wherein the communications between the server-based application and the client are encrypted.

5. The computer storage medium of claim 1, the remote business object property comprising:
- a field;
- a table; or
- a user control setting.

6. The computer storage medium of claim 1, wherein the operations further comprise based on a determination of an invalid value of the updated remote business object property, communicating visual indication of the invalid updated remote business object property to the client.

7. The computer storage medium of claim 1, wherein the operations further comprise:
- instantiating a remote business object at the client based on the updated hosted business object; and
- updating the hosted business rules prior to receiving the updated remote business object property.

8. The computer storage medium of claim 1, wherein the operations further comprise:
- identifying a second hosted business object associated with the hosted business object, the second hosted business object corresponding to a second remote business object property on the client;
- processing the second hosted business object based on the received updated remote business object property; and
- communicating the updated second hosted business object to the client.

9. The computer storage medium of claim 1, the updated business object property comprising a data value and a property identifier.

10. A system of one or more computers configured to perform operations comprising:
- receiving an updated remote business object property from a client;
- determining a validity of a value of the updated remote business object property by comparing the value to one or more validity rules that define at least one of a character form of the value or a value range of the value;
- based on a determination of a valid value, processing the updated remote business object property into the hosted business object using hosted business rules, the hosted business object comprising a representation of a type of a uniquely identifiable business entity described by a structural model, wherein the hosted business object comprises:
  - a first hosted business object property corresponding with the updated remote business object property, the first hosted business object property set to the updated remote business object property; and
  - a second hosted business object property related to the updated remote business object property; and
- communicating an updated hosted business object to the client.

11. The system of claim 10, wherein the operations further comprise instantiating a remote business object at the client based on the hosted business object.

12. The system of claim 10, wherein the operations further comprise communicating a hosted business object to the client such that the client instantiates the remote business object based on the received hosted business object.

13. The system of claim 10, wherein the operations further comprise:
- identifying a second hosted business object associated with the hosted business object, the second hosted business object corresponding to a second remote business object on the client;
- processing the second hosted business object based on the received updated remote business object property; and
- communicating an updated second hosted business object to the client.

14. A computer storage medium encoded with a computer program, the program comprising instructions that when executed by one or more computers cause the one or more computers to perform operations comprising:
- identifying, on a server side of a client-server computing system, a hosted business object on a server and a corresponding remote business object at a remote client, the hosted and remote business object each comprising a representation of a type of a uniquely identifiable business entity described by a structural model;
- setting at least one of a plurality of properties in the hosted business object that are associated with hosted business rules such that the updated property of the remote business object can be processed by the hosted business rules to generate an updated hosted business object;
- identifying a second hosted business object property associated with the hosted business object that is related to the updated property;
- adjusting a value of the second hosted business object property based on the updated property;
- identifying a second hosted business object on the server associated with the updated hosted business object; and
- setting at least of a plurality of properties in the second hosted business object based on the updated hosted business object.

15. The computer storage medium of claim 14, wherein the identification occurs in a visual modeling environment and the one or more properties are set using the visual modeling environment.

16. The computer storage medium of claim 14, at least one of the properties comprising:
- a field;
- a table; or
- a user control setting.

17. The computer storage medium of claim 14, the related second hosted business object identified using drag-and-drop techniques in a visual modeling environment.

18. The computer storage medium of claim 14, the property comprising a data value and a property identifier.

19. The method of claim 14, wherein the identification occurs in a visual modeling environment and the one or more properties are set using the visual modeling environment.

20. The method of claim 19, wherein identifying a second hosted business object on the server associated with the updated hosted business object comprises receiving an identification of the related second hosted business object through drag-and-drop techniques in the visual modeling environment.

21. The method of claim 14, at least one of the properties comprising:
- a field;
- a table; or
- a user control setting.

22. The method of claim 14, the property comprising a data value and a property identifier.

23. A computer implemented method for developing software comprising:
- identifying, on a server side of a client-server computing system, a hosted business object on a server and a corresponding remote business object at a remote client, the hosted and remote business object each comprising a representation of a type of a uniquely identifiable business entity described by a structural model;
- setting at least one of a plurality of properties in the hosted business object that are associated with hosted business rules such that the updated property of the remote business object can be processed by the hosted business rules to generate an updated hosted business object;
- identifying a second hosted business object property associated with the hosted business object that is related to the updated property;
- adjusting a value of the second hosted business object property based on the updated property;
- identifying a second hosted business object on the server associated with the updated hosted business object; and
- setting at least of a plurality of properties in the second hosted business object based on the updated hosted business object.

24. A computer-implemented method comprising:
- receiving an updated remote business object property from a client;
- determining a validity of a value of the updated remote business object property by comparing the value to one or more validity rules that define at least one of a character form of the value or a value range of the value;
- based on a determination of a valid value, processing the updated remote business object property into the hosted business object using hosted business rules, the hosted business object comprising a representation of a type of a uniquely identifiable business entity described by a structural model, wherein the hosted business object comprises:
  - a first hosted business object property corresponding with the updated remote business object property, the first hosted business object property set to the updated remote business object property; and
  - a second hosted business object property related to the updated remote business object property; and
- communicating an updated hosted business object to the client.

25. The method of claim 24, further comprising instantiating a remote business object at the client based on the hosted business object.

26. The method of claim 24, further comprise communicating a hosted business object to the client such that the client instantiates the remote business object based on the received hosted business object.

27. The method of claim 24, further comprising:
- identifying a second hosted business object associated with the hosted business object, the second hosted business object corresponding to a second remote business object on the client;
- processing the second hosted business object based on the received updated remote business object property; and
- communicating an updated second hosted business object to the client.

* * * * *